US012553486B2

(12) United States Patent
Bansal et al.

(10) Patent No.: US 12,553,486 B2
(45) Date of Patent: Feb. 17, 2026

(54) BRAKE PAD WEAR MONITORING SYSTEM AND METHOD OF CONTROLLING THE SAME

(71) Applicant: HL MANDO CORPORATION, Pyeongtaek (KR)

(72) Inventors: Robin Bansal, Pyeongtaek (KR); Ashish Chauhan, Pyeongtaek (KR)

(73) Assignee: HL MANDO CORPORATION, Pyeongtaek (KR)

( * ) Notice: Subject to any disclaimer, the term of this patent is extended or adjusted under 35 U.S.C. 154(b) by 397 days.

(21) Appl. No.: 18/164,582

(22) Filed: Feb. 4, 2023

(65) Prior Publication Data
US 2023/0272831 A1    Aug. 31, 2023

(30) Foreign Application Priority Data

Feb. 7, 2022 (KR) .......................... 10-2022-0015396

(51) Int. Cl.
*F16D 66/02* (2006.01)
*B60T 17/22* (2006.01)
*F16D 66/00* (2006.01)

(52) U.S. Cl.
CPC .......... *F16D 66/025* (2013.01); *F16D 66/02* (2013.01); *F16D 66/026* (2013.01); *B60T 17/22* (2013.01); *F16D 2066/006* (2013.01)

(58) Field of Classification Search
CPC ...... F16D 66/025; F16D 66/026; F16D 66/02; F16D 2066/006; F16D 2066/005; B60T 17/22
See application file for complete search history.

(56) References Cited

U.S. PATENT DOCUMENTS

| 8,874,305 B2 * | 10/2014 | Dolgov ................ G05D 1/0088 701/28 |
| 2016/0138665 A1 * | 5/2016 | Antanaitis ............... B60T 17/22 701/70 |

(Continued)

FOREIGN PATENT DOCUMENTS

| DE | 102015120838 A1 * | 6/2017 | .......... F16D 66/021 |
| KR | 20110126815 A | 11/2011 | |

(Continued)

OTHER PUBLICATIONS

KR-20130005110-A (Year: 2013).*
DE-102015128838-A1 (Year: 2017).*
KR Office Action dated Aug. 1, 2025.

*Primary Examiner* — Thomas J Williams
(74) *Attorney, Agent, or Firm* — Harvest IP Law, LLP

(57) ABSTRACT

Disclosed herein is a brake pad wear monitoring system including a brake pedal sensor configured to detect the displacement of a brake pedal, a wheel speed sensor configured to detect each wheel speed of a vehicle, a pressure sensor configured to detect the braking pressure of the vehicle, and a controller electrically connected to the wheel speed sensor and the pressure sensor, wherein, when the braking pressure detected through the pressure sensor is higher than a preset pressure during braking of the vehicle, the controller calculates each of an expected stopping distance and an actual stopping distance of the vehicle according to the detected each wheel speed, and based on the expected stopping distance, the actual stopping distance, and the displacement of the brake pedal, the controller determines the wear of a brake pad.

6 Claims, 5 Drawing Sheets

(56) References Cited

U.S. PATENT DOCUMENTS

| | | | |
|---|---|---|---|
| 2019/0176794 A1* | 6/2019 | Pinto, IV | B60T 7/18 |
| 2019/0234475 A1* | 8/2019 | Hall | F16D 66/027 |
| 2019/0389442 A1* | 12/2019 | Kim | B60T 7/12 |
| 2023/0272831 A1* | 8/2023 | Bansal | F16D 66/026 |
| | | | 188/1.11 L |

FOREIGN PATENT DOCUMENTS

| | | | | |
|---|---|---|---|---|
| KR | 10-2013-0005110 A | | 1/2013 | |
| KR | 20130005110 A | * | 1/2013 | B60T 8/32 |
| KR | 10-2015759 B1 | | 10/2019 | |

* cited by examiner

BRAKE PAD WEAR MONITORING SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2022-0015396, filed on Feb. 7, 2022 in the Korean Intellectual Property Office, the disclosure of which is incorporated herein by reference.

BACKGROUND

1. Field

Embodiments of the present disclosure relate to a brake pad wear monitoring system for monitoring brake pad wear, and a method of controlling the same.

2. Description of the Related Art

In general, a vehicle is braked when a frictional force between a brake disc and a brake pad of a wheel reduces the rotational force of the wheel. When the vehicle is braked, the brake pad is worn in proportion to a braking force.

When a brake pad is worn beyond a certain level, direct friction occurs between a brake pad plate and a brake disc, which may cause defects in the brake disc, generate noise, and reduce a braking force.

In the past, a brake pad wear sensor was installed on a brake pad to detect a wear amount of the brake pad, and when the wear amount of the brake pad was detected through the brake pad wear sensor and the brake pad was worn beyond a certain level, a brake pad replacement time was notified to a driver.

However, in the past, since a brake pad wear sensor had to be installed on a brake pad, not only costs of the sensor were added, but also an electrical wiring device was required. For this reason, installation and assembly may be complicated, and product costs may increase.

SUMMARY

Therefore, it is an aspect of the present disclosure to provide a brake pad wear monitoring system for monitoring brake pad wear based on a sensor value detected during braking of a vehicle, and a method of controlling the same.

Additional aspects of the disclosure will be set forth in part in the description which follows and, in part, will be obvious from the description, or may be learned by practice of the disclosure.

In accordance with one aspect of the present disclosure, a brake pad wear monitoring system includes a brake pedal sensor configured to detect a displacement of a brake pedal, a wheel speed sensor configured to detect each wheel speed of a vehicle, a pressure sensor configured to detect the braking pressure of the vehicle, and a controller electrically connected to the wheel speed sensor and the pressure sensor, wherein, when the braking pressure detected through the pressure sensor is higher than a preset pressure during braking of the vehicle, the controller calculates each of an expected stopping distance and an actual stopping distance of the vehicle according to the detected each wheel speed, and based on the expected stopping distance, the actual stopping distance, and the displacement of the brake pedal, the controller determines the wear of a brake pad.

When the actual stopping distance is longer than the expected stopping distance and the displacement of the brake pedal is greater than a preset displacement, the brake pad may be determined to be worn.

When the displacement of the brake pedal reaches the preset displacement corresponding to the wear of the brake pad, the controller may determine that the brake pad is worn.

The brake pad wear monitoring system may include an inclination sensor configured to detect the inclination of a road surface of the vehicle, wherein, based on the each detected wheel speed and the detected inclination of the road surface, the controller calculates the expected stopping distance, and based on the detected each wheel speed, the controller calculates the actual stopping distance.

In accordance with another aspect of the present disclosure, a method of controlling a brake pad wear monitoring system includes, during braking of a vehicle, detecting the braking pressure of a vehicle, each wheel speed, and the displacement of a brake pedal of the vehicle, and when the braking pressure is higher than a preset pressure, calculating each of an expected stopping distance and an actual stopping distance of the vehicle according to the each wheel speed of the vehicle, and determining the wear of a brake pad based on the expected stopping distance, the actual stopping distance, and the displacement of the brake pedal.

The determining of the wear of the brake pad may include, when the actual stopping distance is longer than the expected stopping distance and the displacement of the brake pedal is greater than a preset displacement, determining that the brake pad is worn.

The determining of the wear of the brake pad may include, when the displacement of the brake pedal reaches the preset displacement that corresponds to the wear of the brake pad, determining that the brake pad is worn.

The calculating of each of the expected stopping distance and the actual stopping distance of the vehicle may include, based on each wheel speed and the inclination of a road surface of the vehicle, calculating the expected stopping distance, and based on the each wheel speed of the vehicle, calculating the actual stopping distance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
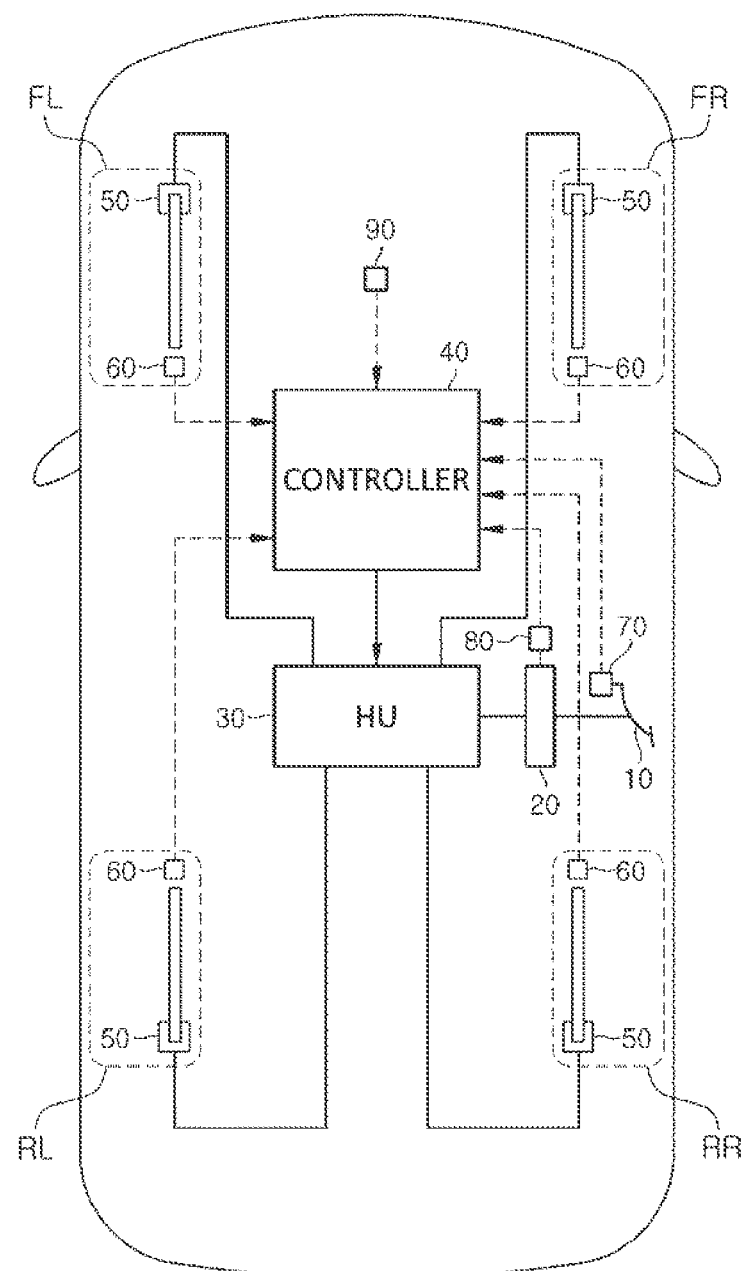
FIG. 1 is a diagram of a configuration of a brake pad wear monitoring system according to an embodiment.

Like reference numerals refer to like elements throughout the specification. Not all elements of embodiments of the present disclosure will be described, and description of what is commonly known in the art or what overlaps each other in the embodiments will be omitted. The terms as used throughout the specification, such as "part," "module," "member," and "block," may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" to another element, it can be directly or indirectly connected to another element, wherein the indirect connection includes "connection via a wireless communication network."

In addition, when a part "includes" or "comprises" an element, unless there is a particular description contrary thereto, the part may further include other elements, not excluding the other elements.

Throughout the present specification, the term "on" that is used to designate a position of one element with respect to another element includes both a case in which the one element is in contact with the other element and a case in which any other element is present between these two elements.

The terms "first," "second," and the like are used to distinguish a certain element from another element, but elements should not be construed as being limited by the terms. A singular expression includes a plural expression unless the context clearly indicates otherwise.

An identifier is used for convenience of the description but is not intended to illustrate the order of operations. The operations may be implemented in an order different from the illustrated order unless the context clearly indicates otherwise.

FIG. 1 is a diagram of a configuration of a brake pad wear monitoring system according to an embodiment.

Referring to FIG. 1, the brake pad wear monitoring system may include a hydraulic pressure generator 20 configured to generate brake hydraulic pressure based on a pedal displacement when a driver presses a brake pedal 10, a hydraulic unit (HU) 30 connected to the hydraulic pressure generator 20 and configured to supply braking pressure to each of wheels FL, FR, RL, and RR, and a controller 40 configured to control the HU 30.

The hydraulic pressure generator 20 may include a master cylinder configured to generate brake hydraulic pressure according to a brake pedal effort boosted by a booster configured to boost the pedal effort of the brake pedal 10.

The HU 30 controls the braking pressure supplied to or released from a brake caliper 50 provided on each of the wheels FL, RR, RL, and FR.

A wheel speed sensor 60 is provided on each wheel to detect a wheel speed of each wheel. An each wheel speed signal detected by each wheel speed sensor 60 is transmitted to the controller 40. The controller 40 may recognize the each wheel speed according to the each wheel speed signal.

A brake pedal sensor 70 detects a pedal displacement of the brake pedal 10 by a driver. A brake pedal operation signal detected by the brake pedal sensor 70 is transmitted to the controller 40. The controller 40 may recognize a driver's braking intention and the required braking pressure according to the brake pedal operation signal.

A pressure sensor 80 is provided in the master cylinder of the hydraulic pressure generator 20 and detects the pressure of a pressure medium in the master cylinder. A braking pressure signal detected by the pressure sensor 80 is transmitted to the controller 40. The controller 40 may recognize the braking pressure according to the braking pressure signal. In addition, the controller 40 may also recognize a driver's braking intention and the required braking pressure according to the braking pressure signal.

An inclination sensor 90 detects the inclination of a road surface of a vehicle. The inclination sensor 90 may include a G sensor configured to detect the deceleration of the vehicle. An inclination signal detected by the inclination sensor 90 is transmitted to the controller 40. The controller 40 may recognize the inclination of a road surface according to the inclination signal.

The controller 40 may adjust the brake hydraulic pressure supplied to or released from the brake caliper 50 provided on each of the wheels FL, RR, RL, and FR through the HU 30.

The HU 30 may adjust a braking force of each wheel by supplying brake hydraulic pressure to the brake caliper 50 or releasing brake hydraulic pressure according to a control signal of the controller 40.

Figure 2:
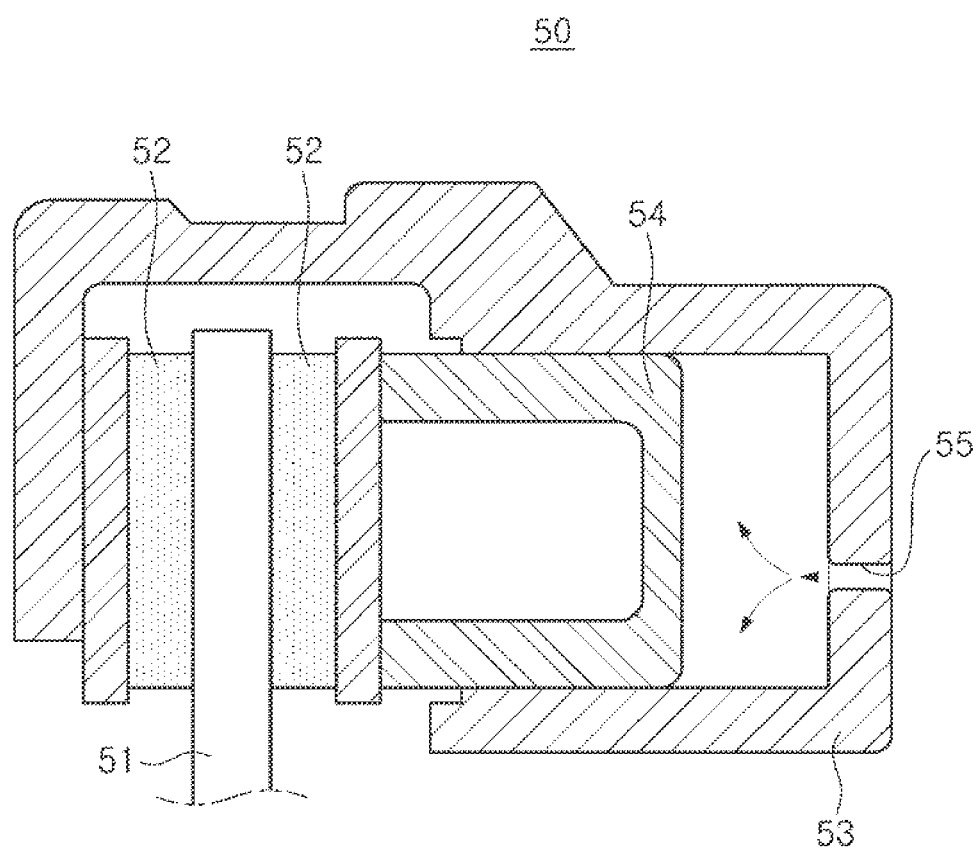
FIG. 2 is a schematic cross-sectional view of a brake caliper in a vehicle to which a brake pad wear monitoring system is applied according to an embodiment.

FIG. 2 is a schematic cross-sectional view of a brake caliper in a vehicle to which a brake pad wear monitoring system is applied according to an embodiment.

Referring to FIG. 2, when a brake fluid does not flow into a wheel cylinder 53 of a brake caliper 50 from the HU 30, in a state in which a clearance C having a preset interval is formed between contact surfaces, each brake pad 52 may be disposed to face a brake disc 51.

When a brake fluid flows from the HU 30 to a hydraulic port 55 to flow into the wheel cylinder 53, a piston 54 in the wheel cylinder 53 moves forward or backward by the brake hydraulic pressure, and as the piston 54 moves, the brake pad 52 may be pressed. Thus, the brake pad 52 may relatively approach the brake disc 51.

In a state in which the brake pad 52 is in contact with the contact surface of the brake disc 51, when a brake fluid additionally flows into the wheel cylinder 53, the brake pad 52 may further press the brake disc 51. Accordingly, a braking force corresponding to the amount of the brake fluid in the wheel cylinder 53, that is, the brake hydraulic pressure, may be provided to a wheel.

Although it has been described in the embodiment that the brake caliper 50 is operated by brake hydraulic pressure, the present disclosure is not limited thereto, and the same may be applied to a brake caliper operated by an electric motor.

When a vehicle is to be braked, the brake pad 52 should strongly hold the brake disc 51.

As described above, when the brake pad 52 is worn beyond a certain level, direct friction occurs between the brake disc 51 and a brake pad plate on which the brake pad 52 is mounted, which may cause defects in the brake disc 51, generate noise, and reduce a braking force. In the past, a brake pad wear sensor was installed on the brake pad 52 to detect a wear amount of the brake pad, and when the wear amount of the brake pad 52 was detected through the brake pad wear sensor, and the brake pad 52 was worn beyond a certain level, a replacement time for the brake pad 52 was notified to a driver. However, since a brake pad wear sensor should be installed on the brake pad 52, not only costs of the sensor are added, but also an electrical wiring device is required, which complicates installation and assembly and increases product costs.

Figure 3:
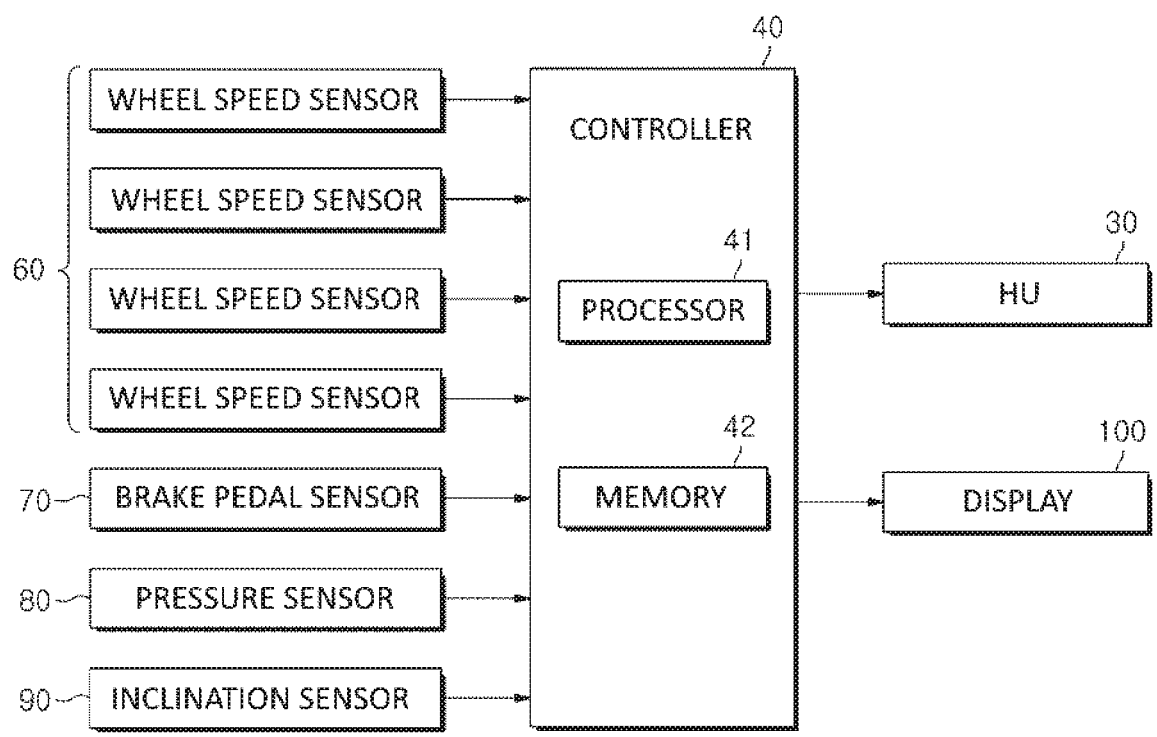
FIG. 3 is a control block diagram of a brake pad wear monitoring system according to one embodiment.

FIG. 3 is a control block diagram of a brake pad wear monitoring system according to one embodiment.

Referring to FIG. 3, the brake pad wear monitoring system includes a controller 40 configured to perform overall control.

A wheel speed sensor 60, a brake pedal sensor 70, a pressure sensor 80, and an inclination sensor 90 are electrically connected to an input side of the controller 40.

A display 100 is electrically connected to an output side of the controller 40. In addition, an HU 30 may be electrically connected to the output side of the controller 40.

The display 100 may display a wear state of a brake pad 52 according to a control signal of the controller 40. The display 100 may give a warning about the wear of the brake pad 52. The display 100 may output a message related to a replacement time for the brake pad 52 to notify a driver of the replacement time for the brake pad 52. The display 100 may be a cluster that is an instrument panel displaying various types of information of a vehicle.

The controller 40 may include a plurality of semiconductor devices and may be variously called an electronic control unit (ECU) and the like.

The controller 40 may include a processor 41 and a memory 42.

The memory 42 may provide programs and data to the processor 41 and may store temporary data generated during an arithmetic operation of the processor 41.

The memory 42 may include a non-volatile memory element such as a cache, a read only memory (ROM), a programmable ROM (PROM), an erasable programmable ROM (EPROM), an electrically erasable programmable ROM (EEPROM), or a flash memory. In addition, the memory 42 may include a volatile memory element such as a random access memory (RAM) and/or a storage medium such as a hard disk drive (HDD) or a solid state drive (SSD).

The processor 41 may include an arithmetic circuit, a memory circuit, and a control circuit. The processor 41 may include one semiconductor device or a plurality of semiconductors. Also, the processor 41 may include one core or a plurality of cores in one semiconductor device. The processor 41 may be variously called a micro processing unit (MPU) and the like.

When the braking pressure is higher than a preset pressure during braking of a vehicle, the controller 40 having such a configuration calculates each of an expected stopping distance and an actual stopping distance of the vehicle and determines the wear of the brake pad 52 based on the expected stopping distance, the actual stopping distance, and a displacement of a brake pedal.

When the braking pressure is higher than 800 psi during braking of a vehicle, the controller 40 may calculate each of an expected stopping distance and an actual stopping distance from a wheel speed, and when the actual stopping distance is longer than a distance obtained by adding an allowable error to the expected stopping distance, and the brake pedal 10 is fully depressed, the controller 40 may determine that the brake pad 52 is worn. In this case, the degree of wear of the brake pad 52 may be determined according to what extent the brake pedal 10 is pressed. As an example, it may be determined that the wear amount of the brake pad 52 increases as the displacement of the brake pad 52 increases. The controller 40 may display the degree of wear of the brake pad 52 or a replacement time on the display 100 to provide a notification to a driver.

Figure 4:
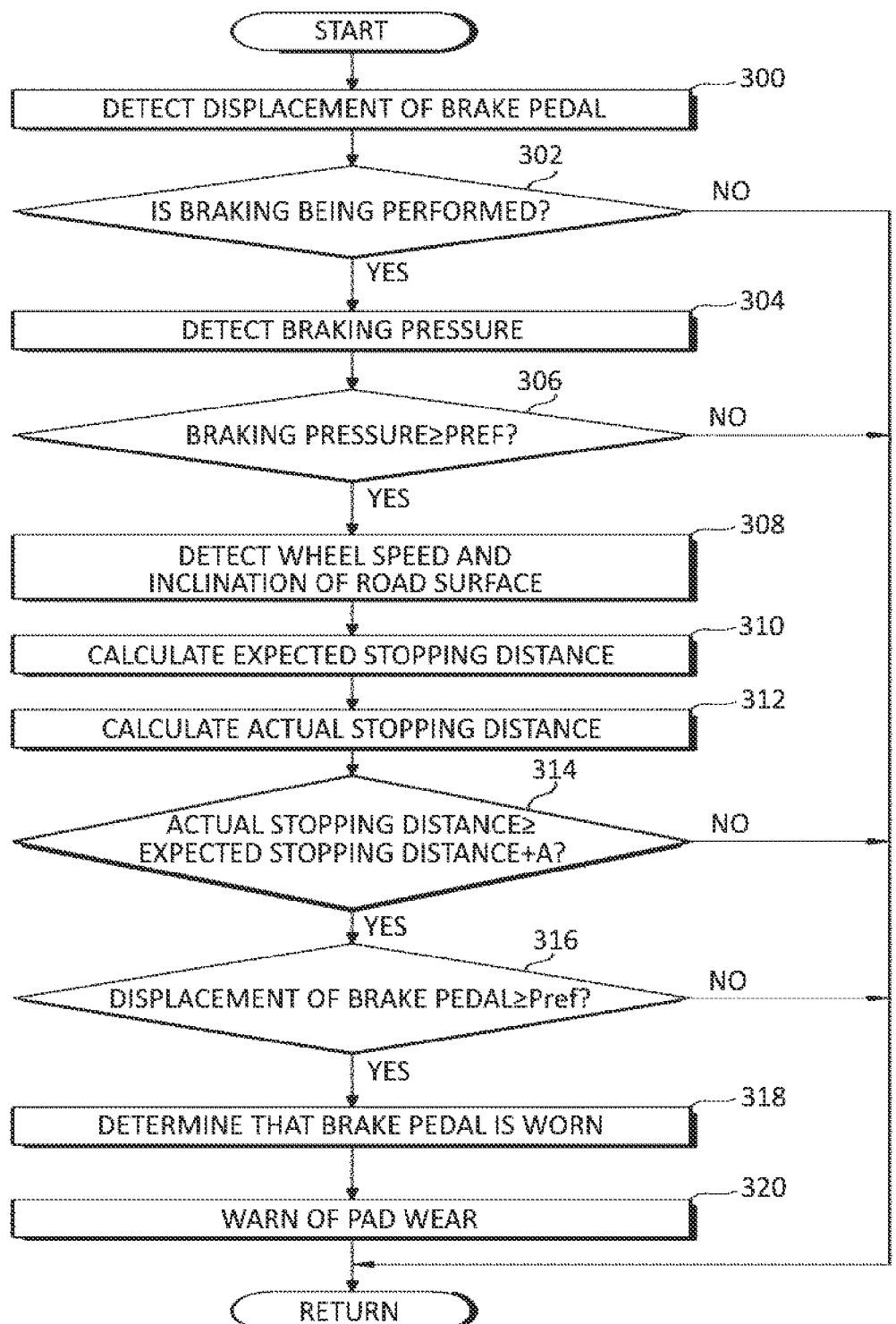
FIG. 4 is a control flowchart of a method of controlling a brake pad wear monitoring system according to an embodiment.

FIG. 4 is a control flowchart of a method of controlling a brake pad wear monitoring system according to an embodiment.

Referring to FIG. 4, a controller 40 detects the displacement of a brake pedal 10 through a brake pedal sensor 70 (300).

The controller 40 determines whether the vehicle is being braked according to the displacement of the brake pedal 10 (302). When the manipulation of the brake pedal 10 is detected, the controller 40 determines that the vehicle is being braked.

When the vehicle is being braked, the controller 40 detects the braking pressure through a pressure sensor 80 (304). The controller 40 may detect the pressure in a master cylinder of a hydraulic pressure generator 20 and determine the pressure in the master cylinder to be the braking pressure. Instead of the pressure in the master cylinder, wheel pressure may be detected and determined to be the braking pressure.

The controller 40 determines whether the braking pressure during braking of the vehicle is higher than or equal to a preset pressure Pref (306). The preset pressure Pref may be the braking pressure when a driver strongly presses the brake pedal 10. The preset pressure Pref may be, for example, 800 psi, as the full braking pressure.

The controller 40 detects each wheel speed through a wheel speed sensor 60 and detects the inclination of a road surface through an inclination sensor 90 (308).

The controller 40 calculates an expected stopping distance of the vehicle based on the detected wheel speed and inclination of the road surface (310) and calculates an actual stopping distance (312).

Figure 5:
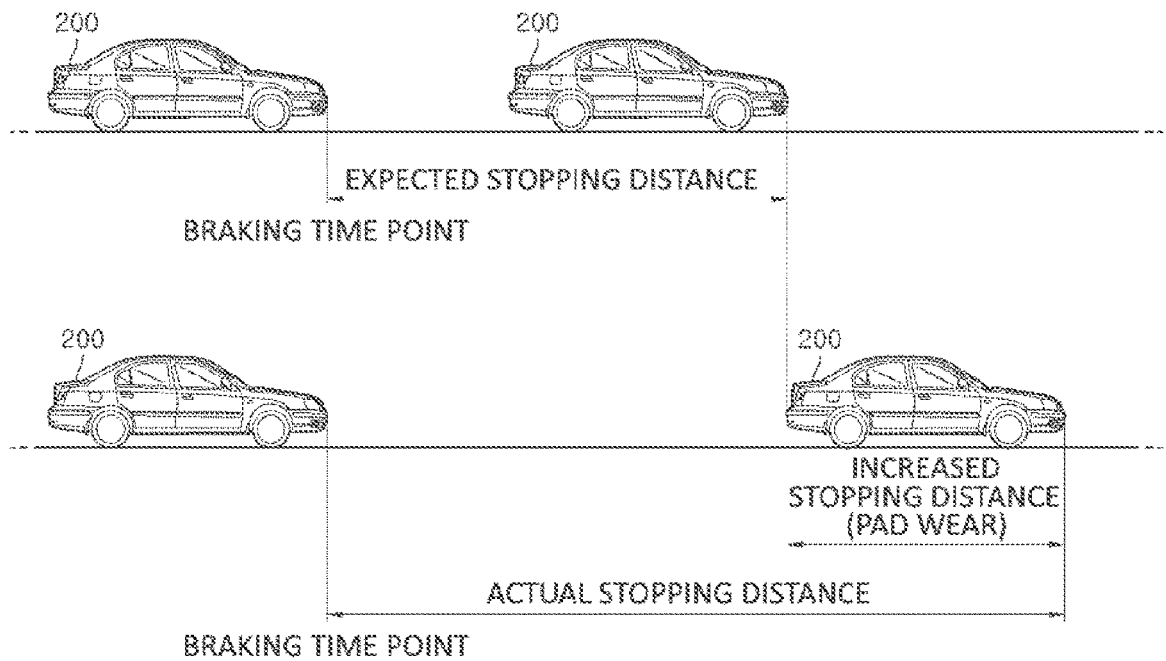
FIG. 5 is a diagram for describing an expected stopping distance and an actual stopping distance of a vehicle in a brake pad wear monitoring system according to an embodiment.

FIG. 5 is a diagram for describing an expected stopping distance and an actual stopping distance of a vehicle in a brake pad wear monitoring system according to an embodiment.

Referring to FIG. 5, the expected stopping distance represents a stopping distance when a vehicle 200 is braked upon initial driving of the vehicle 200, and the actual stopping distance represents a stopping distance when the vehicle 200 is braked after being driven for a certain period.

When the vehicle 200 is braked after being driven for the certain period, the actual stopping distance of the vehicle 200 may be longer than the expected stopping distance. As the vehicle 200 continues to be driven, a brake pad 52 becomes worn, and as a result, a stopping distance of the vehicle 200 also increases.

The expected stopping distance is a stopping distance when the brake pad 52 of the vehicle 200 is not worn. The expected stopping distance may be a design value of a stopping distance before initial driving of the vehicle 200 or a substantially similar stopping distance.

The actual stopping distance may be a stopping distance when the brake pad 52 is worn or worn beyond a certain level due to driving of the vehicle 200 for a certain period.

When the brake pad 52 is worn, the actual stopping distance is increased beyond the expected stopping distance by as much as an increased stopping distance. As described above, when the stopping distance of a vehicle increases, the risk of an accident may also increase.

An expected stopping distance s may be calculated by Equation 1 below.

$$s = (0.278 \times t \times v) + v^2/(254 \times (f+G)) \qquad \text{Equation 1}$$

Here, t denotes a driver's reaction time (sec), v denotes a vehicle speed (km/h), and f denotes a road-tire friction coefficient which is generally 0.7 on a dry road and is in a range of 0.3 to 0.4 on a wet road. G denotes the inclination of a road surface which is positive on an uphill slope and is negative on a downhill slope. t and f may be preset constants.

An actual stopping distance S may be calculated by Equation 2 below.

$$S=(V^2/2\ g) \times a_{ave} \qquad \text{Equation 2}$$

Here, $a_{ave}$ denotes average deceleration when a vehicle stops and is v/((v/a)+0.3 g), v denotes a vehicle speed, a denotes deceleration, and g denotes gravitational acceleration.

Referring to FIG. 4 again, the controller 40 compares the actual stopping distance with a total distance obtained by adding a tolerance a to the expected stopping distance and determines whether an actual stopping distance value is a total distance value or more (314). In this case, the tolerance may be 20% of the expected stopping distance. When the actual stopping distance value is greater than or equal to the total distance value, the controller 40 may recognize that a stopping distance is longer than expected even though full braking is performed.

When the actual stopping distance value is longer than or equal to the total distance value as a determination result in operation 314, the controller 40 determines whether the displacement of the brake pedal 10 is greater than or equal to a preset displacement BPref (316). For example, the preset displacement BPref may correspond to a state in which, when the brake pad 52 has a normal thickness, even when a driver presses the brake pedal 10, the brake pedal 10 is no longer lowered or a position to which, when the brake pad 52 is worn, the brake pedal 10 is moved beyond a threshold value. In order to check whether the reason why a stopping distance is longer than expected despite full braking is caused by the wear of the brake pad 52, whether the brake pedal 10 is in a state of being fully depressed is checked. In order to determine the wear amount of the brake pad 52 according to the degree of displacement of the brake pedal 10, a procedure of comparing two cases may be performed.

Figure 6:
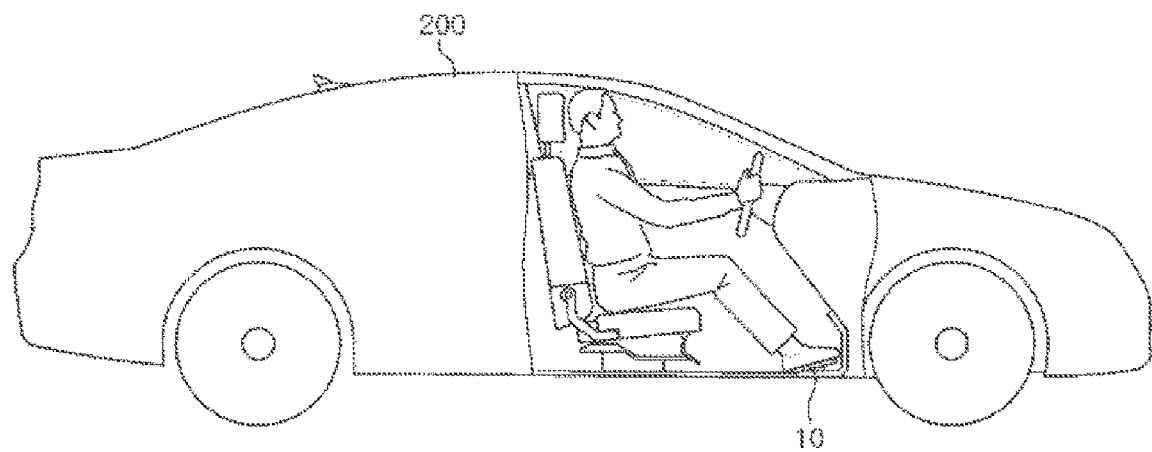
FIG. 6 is a diagram for describing an operation in which, when a vehicle is braked, a brake pedal is fully lowered by a driver in a brake pad wear monitoring system according to an embodiment.

FIG. 6 is a diagram for describing an operation in which, when a vehicle is braked, a brake pedal is fully lowered by a driver in a brake pad wear monitoring system according to an embodiment.

Referring to FIG. 6, a controller 40 determines whether a driver fully depresses a brake pedal 10 when a vehicle is braked based on a change in displacement of the brake pedal 10.

Referring to FIG. 4 again, when the displacement of the brake pedal 10 is greater than or equal to the preset displacement BPref as a determination result in operation 316, the controller 40 determines that the brake pad 52 is worn (318).

When the displacement of the brake pedal 10 reaches a preset displacement corresponding to the wear of the brake pad 52, it may be determined that the brake pad 52 is worn.

The controller 40 warns the driver of the wear of the brake pad by displaying a wear state of the brake pads 52 or a pad replacement time due to pad wear on a display 100 (320).

As described above, according to the present disclosure, without the installation of an additional sensor or electrical wiring device, the wear of a brake pad can be monitored using various sensors used in an existing braking device to more simply and efficiently detect the wear of the brake pad, thereby notifying a driver of a brake pad replacement time in a timely manner.

According to the present disclosure, the wear of a brake pad can be monitored based on a sensor value detected during braking of a vehicle.

In addition, according to present disclosure, without the installation of an additional sensor or electrical wiring device, the wear of a brake pad can be monitored using various sensors used in an existing braking device to more simply and efficiently detect the wear of the brake pad, thereby notifying a driver of a brake pad replacement time in a timely manner.

The above-described controller and/or components thereof may include one or more processor/microprocessor(s) coupled to a computer-readable recording medium storing computer-readable codes/algorithms/software. The processor/microprocessor(s) may execute the computer-readable codes/algorithms/software stored in the computer-readable recording medium to perform the above-described functions, operations, steps, and the like.

The above-described controller and/or the components may further include a memory implemented as a non-transitory computer-readable recording medium or a transitory computer-readable recording medium The memory may be controlled by the above-described controller and/or the components and may be configured to store data, transmitted to or received from the above-described controller and/or the constituent components or to store data processed or to be processed by the above-described controller and/or the components.

The disclosed embodiment may be implemented as computer-readable code/algorithms/software in the computer-readable recording medium. The computer-readable recording medium may be a non-transitory computer-readable recording medium such as a data storage device capable of storing data readable by the processor/microprocessor(s). Examples of the computer-readable recording medium may be an HDD, an SDD, a silicon disk drive (SDD), a ROM, a compact disc read only memory (CD-ROM), a magnetic tape, a floppy disk, an optical recording medium, and the like.

What is claimed is:

1. A brake pad wear monitoring system comprising:
a brake pedal sensor configured to detect a displacement of a brake pedal;
a wheel speed sensor configured to detect each wheel speed of a vehicle;
a pressure sensor configured to detect a braking pressure of the vehicle; and
a controller electrically connected to the wheel speed sensor and the pressure sensor,
wherein the controller is configured to:
perform a brake pad wear determination only when the braking pressure detected through the pressure sensor exceeds a preset pressure during braking of the vehicle,
in response to the braking pressure exceeding the preset pressure, calculate each of an expected stopping distance and an actual stopping distance of the vehicle based on the detected each wheel speed,
compare the actual stopping distance with a sum of the expected stopping distance and a predetermined tolerance,
when the actual stopping distance is greater than or equal to the sum, compare the displacement of the brake pedal with a preset displacement, and
determine wear of a brake pad when the displacement of the brake pedal exceeds the preset displacement.

2. The brake pad wear monitoring system of claim 1, wherein, when the displacement of the brake pedal reaches the preset displacement corresponding to the wear of the brake pad, the controller is configured to determine that the brake pad is worn.

3. The brake pad wear monitoring system of claim 1, further comprising an inclination sensor configured to detect an inclination of a road surface of the vehicle, wherein, based on the detected each wheel speed and the detected inclination of the road surface, the controller is configured to calculate the expected stopping distance; and based on the detected each wheel speed, the controller calculates the actual stopping distance.

4. A method of controlling a brake pad wear monitoring system, the method comprising:

during braking of a vehicle, detecting a braking pressure of the vehicle, each wheel speed, and a displacement of a brake pedal of the vehicle; and performing a brake pad wear determination only when the braking pressure is higher than a preset pressure;

wherein the brake pad wear determination comprises:

calculating each of an expected stopping distance and an actual stopping distance of the vehicle based on the each wheel speed of the vehicle;

comparing the actual stopping distance with a sum of the expected stopping distance and a predetermined tolerance;

when the actual stopping distance is greater than or equal to the sum, comparing the displacement of the brake pedal with a preset displacement; and determining wear of a brake pad when the displacement of the brake pedal exceeds the preset displacement.

5. The method of claim 4, wherein the determining of the wear of the brake pad includes, when the displacement of the brake pedal reaches the preset displacement that corresponds to the wear of the brake pad, determining that the brake pad is worn.

6. The method of claim 4, wherein the calculating of each of the expected stopping distance and the actual stopping distance of the vehicle includes:

based on the each wheel speed and an inclination of a road surface of the vehicle, calculating the expected stopping distance; and based on the each wheel speed of the vehicle, calculating the actual stopping distance.

\* \* \* \* \*